Patented July 30, 1940

2,209,900

UNITED STATES PATENT OFFICE 2,209,900

DENATURANT

Hamline M. Kvalnes, Wilmington, Del., assignor to E. I. du Pont de Nemours & Company, Wilmington, Del., a corporation of Delaware No Drawing. Application September 15, 1937, Serial No. 163,959

19 Claims. (Cl. 202—77)

This invention relates to denaturants and more particularly to denatured alcohols and materials such as esters and the method of denaturing them.

Many proposals have been made in the past for the use of various substances which, when mixed with substances such as an alcohol, an ester or the like, completely change its taste and odor so that it cannot be diverted from its intended use. For example, this procedure has been applied to methanol to avoid its being taken internally, as well as to ethanol and other alcohols which might otherwise be diverted from their intended commercial use to that of a beverage. Similarly, materials such as ethyl acetate, and other esters, which might fairly easily be otherwise converted to alcohols and thus diverted from their intended use, have likewise been denatured. Upon chemical treatment of such esters, the denaturant has been intended to carry over to the alcohol and cause it to be unpotable.

Materials which have been proposed as denaturants before have had one or more characteristics which adapt them for denaturing purposes. There are, however, several specific features which it is desirable to have in a denaturant and all of which have not been possessed to any great degree by the denaturants previously suggested. Thus, for example, it is desirable that a denaturant have an obnoxious taste and a distinctive odor. Substances have been proposed previously which possess disagreeable tastes but the odor carried by the denaturant has often been of such a character as to make the complete denatured alcohol commercially undesirable.

Another characteristic which a denaturant must possess is that of difficulty of removal from the denatured medium. As rapidly as denaturants have been proposed, methods have been discovered for their removal from the denatured medium. The methods utilized for removal of denaturants have been usually chemical treatment of the denatured medium combined with or followed by various distillation steps and further chemical treatment until, finally, relatively pure alcohol has been obtained. Up to the present invention no denaturant extremely difficult of removal has been proposed which possesses an unobjectionable but at the same time distinctive odor together with such a disagreeable taste that the combination practically prohibits its being taken internally.

It is an object of the present invention to overcome the disadvantages of the prior art and to provide a new denaturant and a denatured alcohol which possess the unusual characteristics previously desired but up until now unobtained.

It is a further object of the present invention to provide a denatured ethyl alcohol which possesses a distinctive but unobjectionable odor, and a taste which makes the ethyl alcohol unpotable, neither the taste nor the odor being removable from the ethyl alcohol.

It is an additional object of this invention to provide denatured esters of such a character that if converted to alcohols the denaturant causes such alcohols to be unpotable and of a distinctive odor.

Other objects and advantages of the present invention will be apparent by reference to the following specification in which the preferred embodiments and details are set forth.

According to the present invention a denatured material from which it is extremely difficult if not impossible to remove the denaturant is prepared by mixing with an ester such as ethyl acetate or an alcohol, such as methyl, ethyl, propyl, and the like, relatively small quantities of a cyclic ether of from 3 to 8 carbon atoms, the cyclic ether containing only the elements carbon, hydrogen, and oxygen and in which each oxygen atom is attached to a ring carbon atom.

The denaturants of this invention are generally applicable for treatment of any normally liquid material which it is desired to denature, although, preferably, the material to be denatured should have a boiling point in the range of 30° C. to 250° C. From a material having a boiling point in this range it will be found extremely difficult, if not impossible, to remove my denaturant.

A wide range of alcohols may be successfully denatured or distinguished from one another according to this invention, such, for example, as methyl alcohol, ethyl alcohol, butyl alcohol, isobutyl alcohol, isopropyl alcohol, and others. Similarly, a large number of esters may be successfully denatured or distinguished from one another substantially the only requisites being that the ester should have a boiling point in the range above indicated and, further, the ester should be one which might be fairly easily transformed into an alcohol. Thus, for example, in addition to denaturing ethyl esters, such as ethyl acetate as mentioned before, the denaturants of this invention may be applied to other esters such as methyl, propyl, isopropyl, butyl and isobutyl acetates and the like, or similarly to like formates, propionates, butyrates, isobutyrates and like esters.

It will be found that alcohols produced from esters containing denaturing quantities of one or more denaturants of this invention are likewise denatured, being unpotable and possessing a distinctive odor.

Among the cyclic ethers which are operable according to the present invention are materials known more specifically as oxides, dioxolanes, dioxanes, trioxanes and the like. Of these cyclic ethers, I prefer to utilize those which boil within the range of 50–200° C. and, more specifically, those cyclic ethers whose boiling points are in the more limited range of 75 to 160° C. In this preferred boiling point range are included such materials as the reaction product between ethylene glycol and isobutyraldehyde, which reaction gives glycol isobutylidene dioxide, or 2-isopropyl-1,3-dioxolane. This material, a cyclic ether, is a ring compound containing five members in the ring, with oxygen in the one and three positions.

Similarly, I may utilize 6-methyl-1,3-dioxane which may be prepared by reaction between 1,3-butylene glycol and formaldehyde. Other materials which may be utilized according to the present invention are 6,6-dimethyl-1,3-dioxane, which may be prepared from 3-methyl-1,3-butadiol and formaldehyde; 1,3-dioxolane; 2,2,5,5-tetramethyl-4-ketotetrahydrofuran; 2-ethyl-5-methyl-1,3-dioxolane; 2-methyl-2-ethyl-1,3-dioxolane; 2,4,6-trimethyl-1,3,5-trioxane; 2,4-dimethyl-dioxolone-5, and similar cyclic ethers.

These cyclic ethers possess an ethereal-camphoraceous odor and are unpotable because of taste. Both the odor and the taste persist in spite of the most drastic treatment utilized for their removal. So far as applicant is aware, there is no method by which these materials may be removed from the material denatured by them. Thus, for example, if 200 cc. of denatured ethyl alcohol, prepared by adding 2 parts 6-methyl-1,3-dioxane to 100 parts of pure 95% ethyl alcohol, are mixed with 1000 cc. of one-half saturated salt solution and 50 cc. of white oil, and the mixture thoroughly shaken and allowed to stand for an hour, and thereafter the alcoholic brine layer filtered through 2 grams of Darco and the filtrate distilled using a Widmer column and a draw-off rate of one and one-half cc. per minute and the distillate collected in nine 10% cuts, each cut will be found to have the foreign, undesirable taste, the ethereal, camphoraceous odor of the original denatured alcohol. This treatment, above outlined, is one of the most drastic which can be imagined for the removal of the denaturant, but after following this procedure it is found that the material obtained as a distillate possesses substantially as strong and undesirable a taste and as distinctive an odor as though there had been no attempt to remove the denaturant. Although this example is restricted to 6-methyl-1,3-dioxane as a denaturant, nevertheless all the materials hereinbefore outlined specifically and, as well, the broader class of cyclic ethers generally possess the same characteristics as denaturants.

The following examples illustrate proportions of various materials which may be utilized as denaturants. It will be noted that small quantities only of the denaturant are necessary for denaturing purposes and that the material remaining after treatment for denaturant removal possesses an unpotable taste and a distinctive odor. The proportions given are in parts by volume.

*Example 1*

A denatured alcohol was prepared by mixing 100 parts of pure 95% ethyl alcohol and 5 parts of 1,3-dioxolane.

*Example 2*

A denatured alcohol was prepared by mixing 100 parts of pure 95% methyl alcohol and 3 parts of 1,3-dioxolane.

*Example 3*

A denatured alcohol was prepared by mixing 100 parts of pure 95% ethyl alcohol and 5 parts of 1,4-dioxane.

*Example 4*

A denatured alcohol was prepared by mixing 100 parts of pure 95% ethyl alcohol and 5 parts of 2,2,5,5-tetramethyl-4-ketofuran.

*Example 5*

125 cc. of denatured alcohol, prepared by mixing 100 parts of pure 95% ethyl alcohol and 5 parts of 2-isopropyl-1,3-dioxolane was diluted to 70% with water and mixed with 6.25 cc. of 50% sodium hydroxide solution. This mixture was then distilled using a 15 theoretical plate column and a draw-off rate of 1 cc. per minute. Four 25 cc. cuts were collected. Each of the cuts had an undesirable taste.

*Example 6*

A denatured alcohol was prepared by mixing 100 parts of pure 95% ethyl alcohol and 5 parts of 6,6-dimethyl-1,3-dioxane.

*Example 7*

An unpotable denatured alcohol was prepared by mixing 100 parts of pure 95% ethyl alcohol and 5 parts of 2-ethyl-1,3-dioxolane.

*Example 8*

A completely denatured alcohol was prepared by mixing 100 parts of pure 95% ethyl alcohol, 2.5 parts of aliphatic alcohol boiling in the range 130–150° C. and obtained in the high pressure, high temperature, vapor phase, catalytic synthesis of methanol from carbon monoxide and hydrogen, and 2.5 parts of 2-isopropyl-1,3-dioxolane. The resulting denatured alcohol possessed a distinctive odor which rendered the alcohol unpotable.

*Example 9*

100 cc. of a denatured alcohol, prepared by mixing 100 parts of pure 95% ethyl alcohol and 5 parts of 2-ethyl-5-methyl-1,3-dioxolane, was mixed with 75 cc. of water, 225 cc. of saturated salt solution and 25 cc. of white oil. The mixture was shaken for 2 minutes and allowed to stand an hour. The alcoholic brine was then separated and shaken 2 minutes with a second 25 cc. portion of white oil. After standing an hour the alcoholic brine was treated with two separate 5 g. portions of Darco for 30 minutes each. The filtrate from the second Darco treatment was mixed with 1 g. of sodium carbonate and 1 g. of calcium hypochlorite and distilled using a 15 theoretical plate column and draw-off rate of 1 cc. per minute. All cuts from the distillation were unpotable.

*Example 10*

A completely denatured alcohol was prepared by mixing 100 parts of pure 95% ethyl alcohol, 1 part 2-isopropyl-1,3- dioxolane, 3 parts "Denol," 2 parts "Hydronol," 2 parts Hexone and 1 part gasoline. The resulting denatured alcohol possessed a distinctive odor and an unpotable taste.

*Example 11*

A denatured alcohol prepared by mixing 100 parts of pure 95% ethyl alcohol and 4 parts of 2-methyl-2-ethyl-1,3-dioxolane was treated by the procedure of Example 9. All cuts from the distillation were unpotable.

*Example 12*

A completely denatured alcohol of distinctive odor and unpotable taste was prepared by mixing 100 parts of pure 95% ethyl alcohol, 2 parts 2-isopropyl-1,3-dioxolane, 4 parts ST-115, 1 part gasoline and 0.5 part Agdite.

*Example 13*

A denatured alcohol was prepared by mixing 100 parts of pure 95% ethyl alcohol and 4 parts of 2,4,6-trimethyl-1,3,5-trioxane.

*Example 14*

A denatured alcohol was prepared by mixing 100 parts of pure 95% ethyl alcohol and 4 parts of 2,4-dimethyldioxolone-5.

*Example 15*

A denatured alcohol was prepared by mixing 100 parts of pure 95% ethyl alcohol and 4 parts of 2,5-dimethylfuran.

*Example 16*

A denatured ethyl acetate was prepared by mixing 100 parts of pure 99% ethyl acetate and 0.5 part of 2-isopropyl-1,3-dioxolane.

As indicated in the examples above given, the materials of the present invention may be utilized alone or may be admixed with other denaturing materials such, for example, as "Agdite," "Denol," "Hydronol." It may be desirable, from time to time, to add other denaturing materials which possess stronger and more disagreeable odors than the denaturants of the present invention as a method of distinguishing the denatured alcohol utilized from other denatured alcohols or for other reasons. The material of the present invention is miscible, however, with anything, generally speaking, with which ethyl alcohol is miscible and may, therefore, be utilized in conjunction with other materials.

The proportions utilized according to the present invention may vary from a very small quantity, such as one-half of one per cent, up to 10% by volume or more of the alcohol, or ester which is to be denatured, the amount of denaturant depending entirely upon the degree of odor and taste desired. Small quantities are, however, generally sufficient, i. e. in the range of 0.5 to 5% by volume. A great advantage of the present denaturant resides in the fact that it does not render the alcohol or ester commercially and scientifically undesirable inasmuch as the character of the alcohol is not changed by the incorporation of my denaturant.

Although the specific examples hereinabove given illustrate the use of saturated cyclic ethers, the invention is not to be restricted thereby and it will be understood that the cyclic ethers of this invention may equally as well be unsaturated or substituted or unsubstituted by saturated or unsaturated acyclic or alicyclic radicals. The only requisite is, as set forth before, that the cyclic ether contains only the elements carbon, hydrogen and oxygen and that each oxygen be attached to a ring carbon atom.

Various changes may be made in the present invention without departing therefrom or sacrificing any of the advantages thereof.

I claim:

1. A denatured alcohol containing, as an essential denaturing material, denaturing quantities of a cyclic ether of from 3 to 8 carbon atoms, the cyclic ether containing only carbon, hydrogen, and oxygen in which the oxygen atoms are attached to ring carbon atoms.

2. A denatured alcohol containing, as an essential denaturing material, about 0.5–10% by volume of a cyclic ether of 3 to 8 carbon atoms, the ether containing only carbon, hydrogen, and oxygen in which the oxygen atoms are attached to ring carbon atoms.

3. A denatured ester containing, as an essential denaturing material, denaturing quantities of a cyclic ether of 3 to 8 carbon atoms, the ether containing only carbon, hydrogen, and oxygen in which the oxygen atoms are attached to ring carbon atoms.

4. A denatured ethyl acetate containing, as an essential denaturing material, denaturing quantities of a cyclic ether of from 3 to 8 carbon atoms containing only carbon, hydrogen, and oxygen in which the oxygen atoms are attached to ring carbon atoms.

5. A denatured ethyl alcohol containing, as an essential denaturing material, denaturing quantities of a cyclic ether of from 3 to 8 carbon atoms, the cyclic ether containing only carbon, hydrogen, and oxygen in which the oxygen atoms are attached to ring carbon atoms.

6. A denatured ethyl alcohol containing, as an essential denaturing material, about 0.5–10% by volume of a cyclic ether of 3 to 8 carbon atoms, the ether containing only carbon, hydrogen, and oxygen in which the oxygen atoms are attached to ring carbon atoms.

7. A denatured ethyl alcohol containing, as an essential denaturing material, about 0.5–5% by volume of a cyclic ether of 3 to 8 carbon atoms, the ether containing only carbon, hydrogen, and oxygen in which the oxygen atoms are attached to ring carbon atoms.

8. A denatured alcohol containing, as a denaturant, 6-methyl-1,3-dioxane.

9. A denatured alcohol containing denaturing quantities of 6-methyl-1,3-dioxane.

10. A denatured alcohol containing, as a denaturant, 0.5–10% of 6-methyl-1,3-dioxane.

11. A denatured alcohol containing, as a denaturant, 0.5–5% of 6-methyl-1,3-dioxane.

12. A denatured alcohol containing, as an essential denaturing material, 2-isopropyl-1,3-dioxolane.

13. A denatured alcohol containing, as an essential denaturing material, denaturing quantities of 2-isopropyl-1,3-dioxolane.

14. A denatured alcohol containing, as an essential denaturing material, 0.5–10% by volume of 2-isopropyl-1,3-dioxolane.

15. A denatured alcohol containing, as an essential denaturing material, 0.5–5% by volume of 2-isopropyl-1,3-dioxolane.

16. A denatured alcohol containing, as an essential denaturing material, 2-propyl-1,3-dioxolane.

17. A denatured alcohol containing, as an essential denaturing material, denaturing quantities of 2-propyl-1,3-dioxolane.

18. A denatured alcohol containing, as an essential denaturing material, 0.5–10% by volume of 2-propyl-1,3-dioxolane.

19. A denatured alcohol containing, as an essential denaturing material, 0.5–5% by volume of 2-propyl-1,3-dioxolane.

HAMLINE M. KVALNES.